United States Patent [19]

Dennhardt et al.

[11] 3,985,440

[45] Oct. 12, 1976

[54] PROCESS AND APPARATUS FOR AUTOMATIC EXPOSURE TIME CONTROL IN COPYING DEVICES

[75] Inventors: Werner Dennhardt; Herbert Schröter, both of Taunusstein, Germany

[73] Assignee: Hoechst Aktiengesellschaft, Germany

[22] Filed: Jan. 7, 1976

[21] Appl. No.: 647,237

Related U.S. Application Data

[63] Continuation of Ser. No. 336,386, Feb. 27, 1973, abandoned.

[30] Foreign Application Priority Data

Mar. 1, 1972 Germany............................ 2209681

[52] U.S. Cl.................................. 355/68; 354/33; 354/51; 355/69
[51] Int. Cl.².................... G03B 27/72; G03B 27/78
[58] Field of Search............................ 355/68–71; 354/33, 50, 51, 60 R

[56] References Cited

UNITED STATES PATENTS

| | | | |
|---|---|---|---|
| 3,344,704 | 10/1967 | Simpson et al. | 355/69 |
| 3,397,611 | 8/1968 | Davies | 355/69 X |
| 3,426,357 | 2/1969 | Panlus | 355/68 |
| 3,588,247 | 6/1971 | Noda et al. | 355/69 |
| 3,672,767 | 6/1972 | Pomlengi | 355/69 X |
| 3,677,151 | 7/1972 | Werner et al. | 354/51 |
| 3,683,767 | 8/1972 | Sahara | 354/51 |
| 3,703,130 | 11/1972 | Watanake | 354/51 |
| 3,736,851 | 6/1973 | Ono et al. | 354/51 |
| 3,783,759 | 1/1974 | Wagner et al. | 354/51 |

*Primary Examiner*—Joseph F. Peters, Jr.
*Attorney, Agent, or Firm*—James E. Bryan

[57] ABSTRACT

This invention relates to a process for automatic exposure time control in the exposure of light-sensitive copying material; comprising, photoelectrically measuring the illumination in the plane of the copying material, comparing the voltage produced by the photoelectric measuring means with a reference voltage, which is inversely proportional to time, during exposure, and terminating exposure when a predetermined difference between the two voltages is reached. The invention also includes an apparatus for performing the process.

7 Claims, 3 Drawing Figures

PROCESS AND APPARATUS FOR AUTOMATIC EXPOSURE TIME CONTROL IN COPYING DEVICES

This is a continuation of application Ser. No. 336,386, filed Feb. 27, 1973, now abandoned.

This invention relates to a process and apparatus for automatic exposure time control in the exposure of light-sensitive copying material in dependence upon the illumination measured in the copying plane.

It is known to measure the illumination in the copying plane of a copying device and to adjust the exposure time in accordance with the value measured. This provides independence of fluctuations of the luminous intensity and of the distance of the light source so that, for the adjustment of the exposure, only the light-sensitivity of the copying material is important.

This method of operation is employed, for example, in the exposure of copying material for the photomechanical production of printing plates. The copying layer is exposed in contact under a silver film original, which is a color separation in the case of color printing. Since, in the printing field, the silver film originals generally are manufactured very carefully and with uniform quality, the background density of the original in the transparent areas generally need not be taken into account when copying these films, since this density is very small and, in the case of the same film brand from original to original, is very uniform. It is thus possible to employ a photoelectric transducer, e.g. a photocell, in the exposure plane, but beside the original, and to calibrate the exposure adjustment with this arrangement. The transducer need not be exactly in the exposure plane. Rather, it may be advantageous, in the use of an approximately punctiform light source, to arrange it at about the same distance from that source as the center of the copying material to be exposed, in order to obtain a measured value as representative as possible.

There has been a tendency to automate the copying operation as far as possible also for the described manner of printing plate exposure. Thus, it would be desirable to have a device which, after the adjustment of a factor for the light-sensitivity of the plate, automatically adjusts the correct exposure time in accordance with the illumination measured.

The present invention provides a process and an apparatus for automatic exposure time control in the exposure of copying material in accordance with the illumination measured.

In the present process for automatic exposure time control in the exposure of light-sensitive copying material, the illumination is measured photoelectrically in the plane of the copying material, and, during exposure, the voltage produced directly or indirectly by means of a photoelectric transducer is compared to a reference voltage which varies with time in a manner corresponding to the dependence of the required exposure time on the voltage measured at the transducer. Exposure is completed when both voltages have reached a predetermined difference.

The present invention further provides an apparatus for the performance of the process with a copying light source and a photoelectric transducer for the measurement of the illumination in the plane of the copying material. It contains a time-controlled reference voltage unit producing a reference voltage inversely proportional to time and a comparator circuit between the reference voltage unit and the photoelectric transducer which switches off the copying light source when a predetermined voltage difference has been reached.

By means of the process of the invention, it is possible to properly expose light-sensitive copying materials independently of the type of copying lamp and its distance from the copying plane. In this connection, it has to be taken into account, of course, that, for achieving reliable results, the spectral sensitivity of the photoelectric transducer or of the exposure meter should correspond to that of the light-sensitive material. This may be achieved with the use of suitable filters in front of the exposure meter and/or in front of the copying lamp.

In many cases, it is desirable for photomechanical production of printing plates, with the use of screened masters, to change the gradation of the printing plate by a certain dosed overexposure. In practice, this overexposure usually is adjusted to a certain percentage by way of empirical values. In the process of the invention, this may be achieved in a simple manner by causing the reference voltage to drop slowly by a certain factor by changing a determining value. The desired overexposure factor, e.g. 10 percent, is thus adjusted manually prior to exposure and exposure is then effected in the described manner.

The voltage U measured at a photoelectric transducer, e.g. a photocell, is related to the exposure time $t$ by the following relation:

$$U = \frac{d}{t} \qquad (1),$$

$d$ being a factor depending on the light-sensitivity of the copying material. When a voltage U is measured at the transducer, the correct exposure time $t$ may be determined after calibration of the arrangement for all desired types of copying material, i.e. after determination of the corresponding factors $d$.

In accordance with the invention, a reference voltage is produced, the variation of which corresponds to equation (1). This variable voltage is compared, via a comparator circuit, to the voltage measured at the transducer. When a certain desired voltage difference is reached, preferably equal voltages, exposure to light is completed.

It has proved advantageous to start the time variation of the reference voltage only after a certain interval after the copying light source has been switched on, since otherwise, in accordance with equation (1), one would have to start with an infinitely high voltage in order to achieve the technically preferred voltage equality upon completion of exposure to light.

The waiting time between the switching on of the exposure lamp and the beginning of the variation of the reference voltage preferably should not exceed the shortest exposure time occurring in practice.

The photoelectric transducer may, in known manner, be a photocell, a photovoltaic element, a photodiode, a photoconductive cell or the like, for example, provided that it generates a voltage or that a voltage can be generated by it whose relation to the exposure time is as described above. The designation chosen above, i.e. "the voltage produced directly or indirectly," means that, for example, a photovoltaic element produces the desired voltage directly upon exposure to light. If, however, the transducer used is a photoconductive cell, this cell may be incorporated into a circuit in such a manner that, at a suitable place in this circuit, a voltage may be tapped which also follows the function of equation (1).

The time-controlled reference voltage unit, producing the desired voltage inversely proportional to time, may be constructed in various ways. It is possible, for example, to apply a constant voltage to the ends of a resistor with a resistance decreasing in a certain range inversely proportional to the length and to tap the resistance at a constant speed. The tapped voltage is then inversely proportional to the time. It is also possible to tap a resistor uniformly over its length inversely proportional to time.

It has proved particularly simple to successively switch into a circuit a resistor with a constant resistance and a resistor with a resistance increasing linearly with time, a constant voltage being applied to the circuit and the voltage being tapped at the ends of the resistor with the constant resistance.

Another possibility for constructing the desired reference voltage unit is a simple amplifier circuit into which two resistors are switched in such a way that the voltage at the output of the amplifier is proportional to the first resistance and to the input voltage and inversely proportional to the second resistance. In this case, the second resistance may increase linearly with time and thus a voltage inversely proportional to time may be produced at the output of the amplifier.

A particularly desirable solution resides in the combination of a saw-tooth generator, producing a voltage increasing linearly with time, with a dividing element, i.e. an electronic element, which converts the voltage into its reciprocal value. This embodiment has the advantage that it contains no mechanically moving parts.

The accompanying drawings further illustrate the process and apparatus of the invention:

FIG. 1 represents a coordinate system with the exposure time $t$ as the abscissa and the voltage $U$ of the photoelectric transducer as the ordinate, and shows two hyperbolas $d_1$ and $d_2$ illustrating the variation of the exposure time with the measured voltage according to equation (1) for two copying materials with the light-sensitivity factors $d_1$ and $d_2$.

Figure 2:
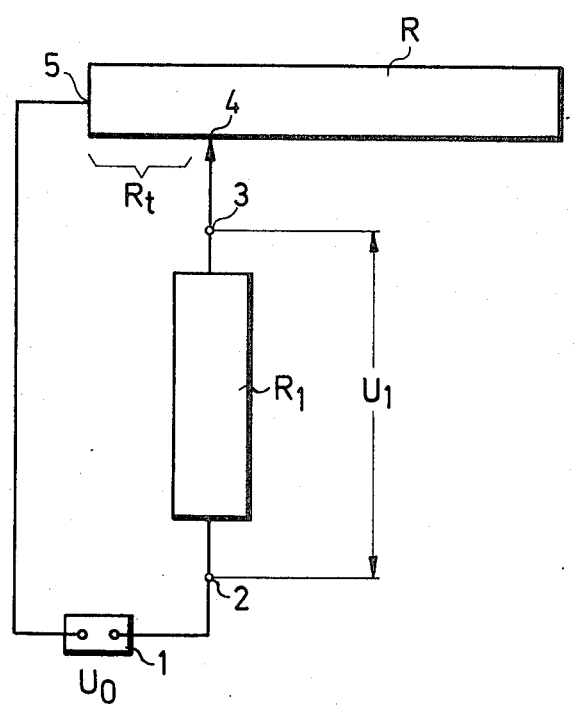
FIG. 2 is a circuit diagram for a simple reference voltage unit variable with time.

The reference voltage unit shown in FIG. 2 is composed of a constant voltage source 1, a constant resistor $R_1$ and resistor R in which, by means of the sliding contact 4, the resistance $R_t$, variable with time, is tapped. At the ends 2 and 3 of the constant resistor $R_1$, the voltage $U_1$ is taken which has the desired time dependency. When the voltage source 1 supplies the voltage $U_o$, the following applies:

$$U_1 = U_o \cdot \frac{R_1}{R_t + R_1} \qquad (2).$$

When $R_t$ is caused to increase linearly with time, $$R_t = c \cdot t \qquad (3)$$

and thus $$U_1 = \frac{U_o \cdot R_1}{c \cdot t + R_1}$$

or $$U_1 = \frac{U_o \cdot R_1}{c(t + R_1/c)} \qquad (4).$$

This function describes a hyperbola displaced by the constant $R_1/c$. This displacement with respect to equation (1) means that a waiting time $$\bar{t} = \frac{R_1}{c} \qquad (5)$$

must pass before starting to change the resistance $R_t$ and, thus, the voltage $U_1$. Consequently, the variable voltage $U_1$ does not originate at infinity but at the finite value $U_o$.

After the waiting time has passed or after the displacement of the hyperbola $$U_1 = \frac{U_o \cdot R_1}{c \cdot t} \qquad (6).$$

The comparison with equation (1) results in $$d = \frac{U_o \cdot R_1}{c} = U_o \cdot \bar{t} \qquad (7).$$

When given a certain value for $\bar{t}$ (e.g. the smallest exposure time occurring in practice for a printing plate type), the voltage $U_o$ is determined via (7). When given $U_o$ and $c$, $R_1$ is determined via the same equation. Thus, the individual values may not be selected independently of one another; they are related with one another.

As soon as a copying material with another light-sensitivity is to be automatically exposed, $d$ in equation (7) changes, which results in a change of the other values. Thus, when changing over to another printing plate type, $U_o$ may be changed while $\bar{t}$ remains constant.

Figure 1:
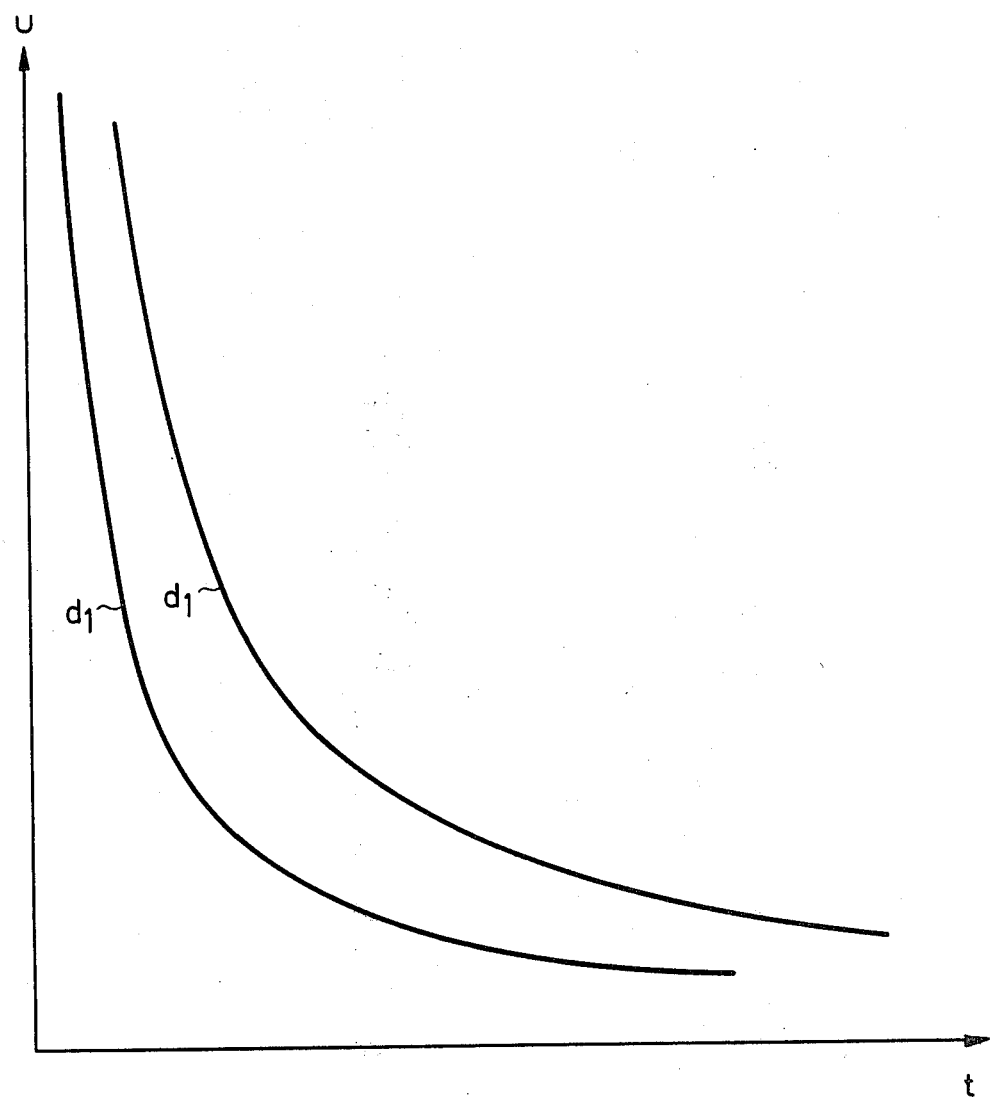
FIG. 1 is a diagrammatic view of equation (1)

When the individual values are properly determined, it is possible to change the voltage $U_1$ by means of the above circuit system as a function of time as is required by the relation indicated in FIG. 1 for a specific printing plate type. This voltage $U_1$ is compared to voltage $U_2$ at the transducer. An exposure lamp is actuated simultaneously by switching and, as soon as voltage $U_2$ has a certain difference with respect to voltage $U_1$, preferably a zero difference, this lamp is switched off again.

In some cases, it is desirable to exceed the exposure time of screened copies by a certain factor with respect to the determined normal exposure. In practice, there are known, for example, certain empirical values for the individual printing plate types by which the presensitized printing plate from which prints are to be made has to be overexposed with respect to the printing plate with which the control or sample print is made, the so-called proof, in order to achieve uniform printing results. Such an empirical value may be stated as a percentage of the normal exposure time. As described above, the exposure time is composed of a "waiting time" and a "switching time." Thus, percentage change of the exposure time may be effected in such a manner that the waiting time as well as the switching time are subject to a percentage change.

Thus, the waiting time $\bar{t}$ may be changed, for example, by adjusting a time delay and the switching time by changing $R_1$ or $c$. Preferably, it will be attempted to change one value only. This is possible by changing $U_o$. As can be seen from equations (6) and (7), it is possible to change the relation between $U_1$ and $t$ by a constant factor in that $U_o$ is changed by that factor and $\bar{t}$ remains constant.

Figure 3:
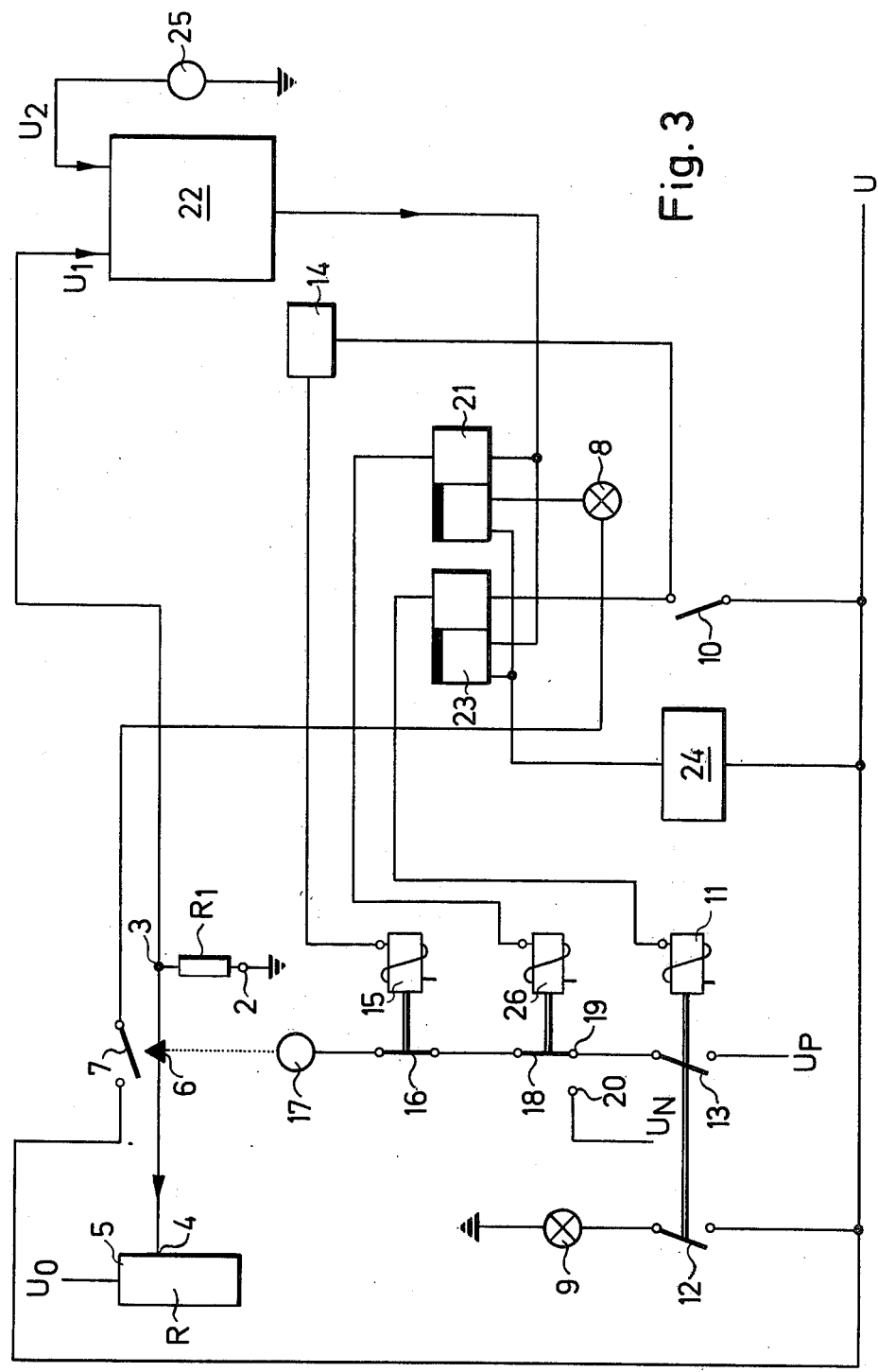
FIG. 3 is a circuit diagram of an exposure time control device in accordance with the invention.

The circuit system is explained by way of the circuit diagram in FIG. 3.

Prior to operation, the sliding contact 4 is at its initial position, i.e. at 5, where it taps, at the resistor R, the resistance $R_t = 0$. In this case, $U_o = U_1$ and the sliding contact 4 closes the switch 7, the significance of which will be explained below. When switch 7 is closed, control lamp 8 lights up, signalling the readiness for operation of the system. The exposure source 9, for the printing plate, is switched on manually via the switch 10 which, in turn, closes the switches 12 and 13 via the relay 11. By closing the switch 12, the lamp 9 is connected to the operational voltage source U. Furthermore, upon the actuation of the switch 10, the "waiting time" begins to pass. This is effected by a time delay element 14 which is actuated by the closing of this switch 10. With the closing of the switch 10, the time delay unit 14 immediately energizes the relay 15, which opens the switch 16. The opening of switch 16 prevents current from flowing to the motor 17, in spite of switch 13 being closed. The waiting time may be adjusted in the time delay unit 14. When it has passed, the relay 15 is deenergized and thus the switch 16 is closed. Since, at this time, switch 18 is in contact with contact 19 and switch 13 has been closed, the voltage $U_p$ is applied to the motor 17; it begins to run, moves the sliding contact 4 and, at the resistor R, taps the resistance $R_t$ which increases proportionally with time. The voltage $U_1$ applied to the resistor $R_1$ also changes thereby as a function of time according to equation (6).

When the sliding contact 4 moves, the switch 7 is opened, the control lamp goes out and flip-flop swtich 21 is made operationally ready for a pulse from voltage comparator 22.

A flip-flop switch is an electronic switch with several inputs (in the present case 3) and 2 outputs (in the present case only one is used). One of the two outputs is related to each input. When a pulse is given from an input to the switch, a voltage is applied to the output related thereto and the voltage 0 is applied to the output not related thereto.

In order that, after the switching on of the voltage supply, the flip-flop switches 21 and 23 are in a defined position or reset, a zero-pulser 24 supplies a pulse to the inputs of both switches when the entire arrangement is switched on.

Voltage comparator 22 compares the voltage $U_1$ with the fixed voltage $U_2$, which is supplied by the photocell 25. As soon as the two values are equal, the comparator supplies a pulse to the flip-flop switches 21 and 23. The switch 23 opens the switches 12 and 13, via relay 11, and the lamp 9 and the motor 17 are switched off thereby. The switch 21 connects the switch 18 to contact 20, via relay 26, and the voltage $U_N$ is thereby applied to motor 17, which voltage inverts the direction of rotation of the motor. The motor runs in the opposite direction and returns the sliding contact 4 to its initial position at terminal end 5. The switch 7 is then actuated. It supplies a pulse to the flip-flop switch 21 and this switch tilts back. The switch 18 is again connected via relay 26 to the contact 19 and the motor 17 thereby comes to a standstill. With the closing of the switch 7, the control lamp 8 lights up again and thus signals the readiness for operation for the next exposure cycle; after which a new printing plate may be exposed to light.

It will be obvious to those skilled in the art that many modifications may be made within the scope of the present invention without departing from the spirit thereof, and the invention includes all such modifications.

What is claimed is:

1. A process for automatic exposure time control in the exposure of light-sensitive copying material, comprising photoelectrically measuring the illumination in the plane of the copying material, generating during exposure a reference voltage U, which is inversely proportional to time T, U being equal to a constant divided by T, comparing said reference voltage during exposure with the voltage produced by the photoelectric measuring means, and terminating exposure when a predetermined difference between the two voltages is reached.

2. A process according to claim 1, wherein the variation of the reference voltage starts a predetermined interval after the beginning of exposure, which interval does not exceed the shortest exposure time occurring in practice.

3. A process according to claim 1, wherein exposure is terminated when the voltage difference is zero.

4. A process according to claim 1, wherein the variance of the reference voltage with time is delayed a predetermined period of time after the exposure of the copying material is begun.

5. An apparatus for automatic time control of a unit for the exposure of light-sensitive copying material with a copying light source; comprising, a photoelectric transducer for photoelectrically measuring the illumination in the plane of the copying material,
  a time-controlled reference voltage unit for producing a reference voltage U inversely proportional to time T, U being equal to a constant divided by T,
  a comparator circuit connected to said reference voltage unit and said photoelectric transducer,
  and switch means for turning off said copying light source when a predetermined voltage difference between the voltage of said reference voltage unit and said photoelectric transducer is reached.

6. An apparatus according to claim 5, wherein the time-controlled reference voltage unit includes a resistor having a constant resistance and a resistor having a resistance increasing linearly with time connected in series and the voltage at the ends of the constant resistor is used as the reference voltage.

7. An apparatus according to claim 5, wherein the time-controlled reference voltage unit includes time-delay means for delaying the variance of the voltage of said reference voltage unit with time.

* * * * *